United States Patent
Brisson et al.

(10) Patent No.: US 8,152,193 B2
(45) Date of Patent: Apr. 10, 2012

(54) WATERCRAFT TRAILER

(75) Inventors: Hugo Brisson, Valcourt (CA); Christian Labbe, Saint-Denis-de-Brompton (CA); Daniel Mercier, Magog (CA); Joey Larouche, Mont-Saint-Hilaire (CA); Bruno Girouard, Shefford (CA); Eric Fournier, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 13/083,117

(22) Filed: Apr. 8, 2011

(65) Prior Publication Data

US 2011/0181019 A1  Jul. 28, 2011

Related U.S. Application Data

(62) Division of application No. 12/261,712, filed on Oct. 30, 2008.

(30) Foreign Application Priority Data

Apr. 30, 2008  (WO) ................ PCT/US2008/062024

(51) Int. Cl.
    *B60P 3/10* (2006.01)
(52) U.S. Cl. .................................... 280/414.1; 114/344
(58) Field of Classification Search ............... 280/414.1, 280/414.3; 224/406; 114/344
See application file for complete search history.

(56) References Cited

U.S. PATENT DOCUMENTS

| | | | |
|---|---|---|---|
| 3,365,733 A | 1/1968 | Gudmundson | |
| 3,963,263 A * | 6/1976 | Whitlock | 280/414.1 |
| 4,114,920 A * | 9/1978 | Boettcher | 280/414.1 |
| 4,641,851 A * | 2/1987 | Knies | 280/414.1 |
| D292,785 S | 11/1987 | Warren | |
| 4,995,629 A | 2/1991 | Poppell | |
| 5,120,079 A * | 6/1992 | Boggs | 280/414.1 |
| 5,263,733 A * | 11/1993 | Kastenberger et al. | 280/414.1 |
| 5,553,882 A * | 9/1996 | Unruh | 280/508 |
| 5,599,035 A * | 2/1997 | Spence | 280/414.1 |
| 5,683,214 A * | 11/1997 | Jeffreys | 410/77 |
| 5,879,114 A * | 3/1999 | Spence | 410/77 |
| 5,895,185 A * | 4/1999 | Spence | 410/77 |
| 5,899,656 A | 5/1999 | Rahe et al. | |
| 6,904,861 B1 * | 6/2005 | Warner et al. | 114/344 |
| 7,237,788 B1 * | 7/2007 | Norbits | 280/414.1 |
| 2007/0187924 A1 | 8/2007 | Warren | |
| 2008/0265543 A1 * | 10/2008 | Davis et al. | 280/414.1 |

OTHER PUBLICATIONS

International Search Report of PCT/US2008/062024; Apr. 3, 2009; Szaip, Andras.

* cited by examiner

*Primary Examiner* — Kevin Hurley
*Assistant Examiner* — Marc Scharich
(74) *Attorney, Agent, or Firm* — Osler, Hoskin & Harcourt LLP

(57) ABSTRACT

A method of securing a watercraft to a watercraft trailer is disclosed. The method includes driving the watercraft in a watercraft receiving portion of the trailer, moving a lever towards a front of the trailer in response to a hull of the watercraft coming into contact with the lever, and retaining a pin connected to the hull of the watercraft in response to the lever moving towards the front of the trailer. A method of releasing a watercraft from a watercraft trailer is also disclosed.

7 Claims, 17 Drawing Sheets

WATERCRAFT TRAILER

CROSS-REFERENCE

This application is a divisional of U.S. patent application Ser. No. 12/261,712, filed Oct. 30, 2008, which claims priority to International Application No. PCT/US2008/062024, filed Apr. 30, 2008, the entirety of both of which is incorporated herein by reference.

FIELD OF THE INVENTION

The present invention relates to trailers used to transport watercraft, and more specifically to releasable watercraft connectors for such trailers.

BACKGROUND OF THE INVENTION

In order to transport a watercraft from one body of water to another, or between a body of water and a storage location, trailers that can be hitched to a motorized wheeled vehicle are often used. Typically, the trailer is backed down a ramp (either man-made or natural) at least partially into the water. The watercraft is then driven onto the trailer such that the watercraft sits on support structures of the trailer. In most such trailers, the watercraft is guided and aligned onto the trailer by the support structures which are adapted to engage the hull of the watercraft. These structures can consist of one or more beams or rollers. The watercraft is then secured to the trailer as described in greater detail below. Finally, the trailer and watercraft are pulled out of the water using the motorized vehicle.

A winch system located at the front of the trailer is typically used to secure the watercraft to the trailer. The winch system usually consists of a winch having a cable and a hook attached to the end of the cable. When the watercraft is at least partially engaged onto the trailer, a hook is attached to an eyelet on the hull of the watercraft. The winch is then actuated so as to pull the watercraft completely on the trailer.

To release the watercraft from the trailer, once the trailer is backed down a ramp at least partially into the water the winch is actuated so as to provide some slack in the cable to permit the hook to be easily removed from the eyelet in the hull. The watercraft can then be pushed off the trailer.

Although the winch system properly secures the watercraft to the trailer, it requires that the driver of the watercraft get off the watercraft to secure the hook. Similarly, to release the watercraft the driver needs to be off the watercraft. Alternatively, the driver can be on the watercraft as long as another person is available to use the winch system. In either case it means that the driver or the other person, as the case may be, most likely needs to get in the water to secure and release the watercraft.

Furthermore, when the driver of the watercraft is the one securing the watercraft, there is a possibility that the watercraft could start drifting away from the trailer between the time the driver gets off the watercraft and the time the driver makes it to the winch system and is ready to secure the watercraft. A similar problem can occur when the driver of the watercraft releases the watercraft from the trailer.

Therefore, there is a need for a watercraft trailer having a device that can be used to secure a watercraft to a watercraft trailer and that does not require the driver or another person to move to the front of the trailer to manually connect the device to the watercraft in order to secure the watercraft to the trailer.

There is also a need for a watercraft trailer having a device that can be used to secure a watercraft to a watercraft trailer and that does not require the driver or another person to move to the front of the trailer to manually disconnect the device from the watercraft in order to release the watercraft from the trailer.

SUMMARY OF THE INVENTION

It is an object of the present invention to ameliorate at least some of the inconveniences present in the prior art.

It is an object of the present invention to provide a method of securing a watercraft to a watercraft trailer having a releasable connector.

It is another object of the present invention to provide a method of releasing a watercraft from a watercraft trailer having a releasable connector.

In another aspect, the invention provides a method of securing a watercraft to a watercraft trailer. The method comprises driving the watercraft in a watercraft receiving portion of the trailer; moving a lever towards a front of the trailer in response to a hull of the watercraft coming into contact with the lever; and retaining a pin connected to the hull of the watercraft in response to the lever moving towards the front of the trailer.

In an additional aspect, moving the lever towards the front of the trailer includes pivoting the lever towards the front of the trailer in response to the hull of the watercraft coming into contact with the lever.

In a further aspect, retaining the pin connected to the hull of the watercraft in response to the lever moving towards the front of the trailer includes retaining the pin with a hook connected to the lever and pivoting together with the lever towards the front of the trailer. The method further comprises locking the hook in position once the pin is engaged.

In yet another aspect, the invention provides a method of releasing a watercraft from a watercraft trailer, the watercraft being secured to the watercraft trailer by a releasable connector. The method comprises actuating an actuator disposed to one side of a watercraft receiving portion of the trailer; and moving the releasable connector to an unlocked position in response to the actuation of the actuator thus releasing a pin connected to the hull of the watercraft from the releasable connector.

In an additional aspect, the actuator includes a cable connected to the releasable connector; and actuating the actuator includes pulling on the cable.

For purposes of this application, the end of the trailer having the hitch coupler should be understood as corresponding to the front end of the trailer and the terms related to spatial orientation such as forwardly, rearwardly, left, and right, are as they would accordingly be understood.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
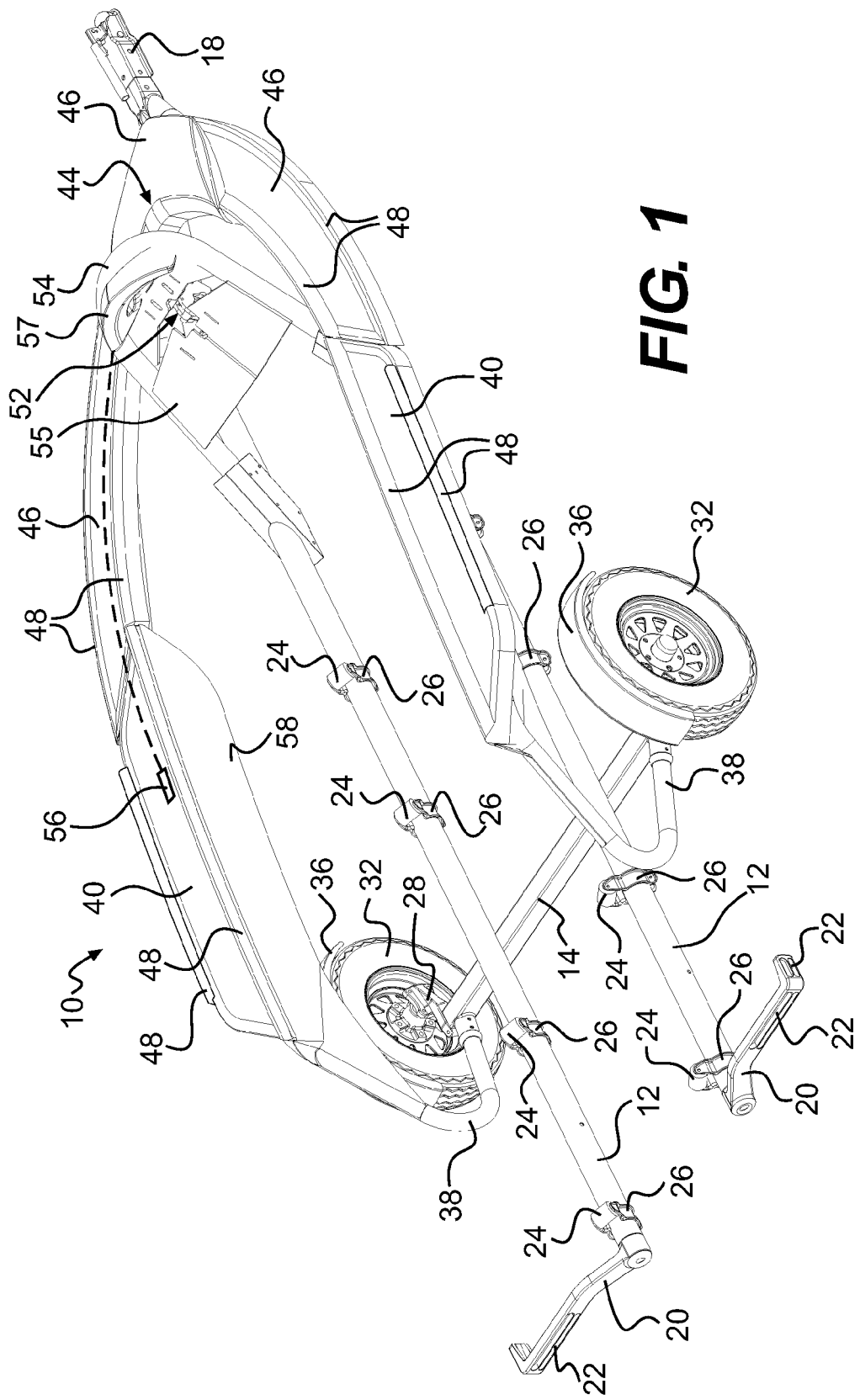
FIG. 1 is a perspective view, taken from a rear, right side, of a first embodiment of a watercraft trailer.

The present invention will be described with respect to trailers adapted to transport personal watercraft. However, it should be understood that the dimensions of the embodiments of the trailers described herein could be increased to accommodate larger watercraft, such as jet boats. Also, the watercraft 47 mentioned below will not be described in detail herein as the construction of such watercraft is believed to be well known. An exemplary personal watercraft is described in detail in U.S. Pat. No. 7,128,014 B2, issued Oct. 31, 2006, the entirety of which is incorporated herein by reference. An exemplary jet boat is described in detail in United States Patent Publication No. 2007/0186839 A1, published Aug. 16, 2007, the entirety of which is incorporated herein by reference.

FIGS. 1 to 10 illustrate a first embodiment of a watercraft trailer 10. The trailer 10 has a lower frame having left and right longitudinally extending lower frame members 12 and a laterally extending lower frame member 14. The frame members 12 and 14 are preferably metal tubes, but other materials and shapes (beams for example) are contemplated.

The left and right longitudinally extending lower frame members 12 are disposed on either side of a longitudinal centerline 16 (FIG. 5) of the trailer 10. The front portions of the left and right longitudinally extending lower frame members 12 bend inwardly towards the longitudinal centerline 16 and are connected at the longitudinal centerline 16 by welding, bolts or other mechanical fasteners.

A hitch coupler 18 is welded, fastened, or otherwise connected to the front of the left and right longitudinally extending lower frame members 12. The hitch coupler 18 allows the trailer 10 to be coupled to a matching tow hitch on a vehicle, thus allowing the trailer 10 to be towed by the vehicle. The features of the hitch coupler 18 will vary depending on the type of tow hitch to which one desires to couple the trailer 10. In a preferred embodiment, the hitch coupler 18 is adapted to be coupled to a tow-ball commonly used on road vehicles such as cars and trucks.

A bracket 20 is connected to the rear end of each of the longitudinally extending lower frame member 12 and extends laterally outwardly therefrom. Each bracket 20 has reflectors and/or lights 22 disposed thereon. The reflectors and/or lights 22 are required by many jurisdictions for the trailer 10 to be suitable for road use.

Figure 4:
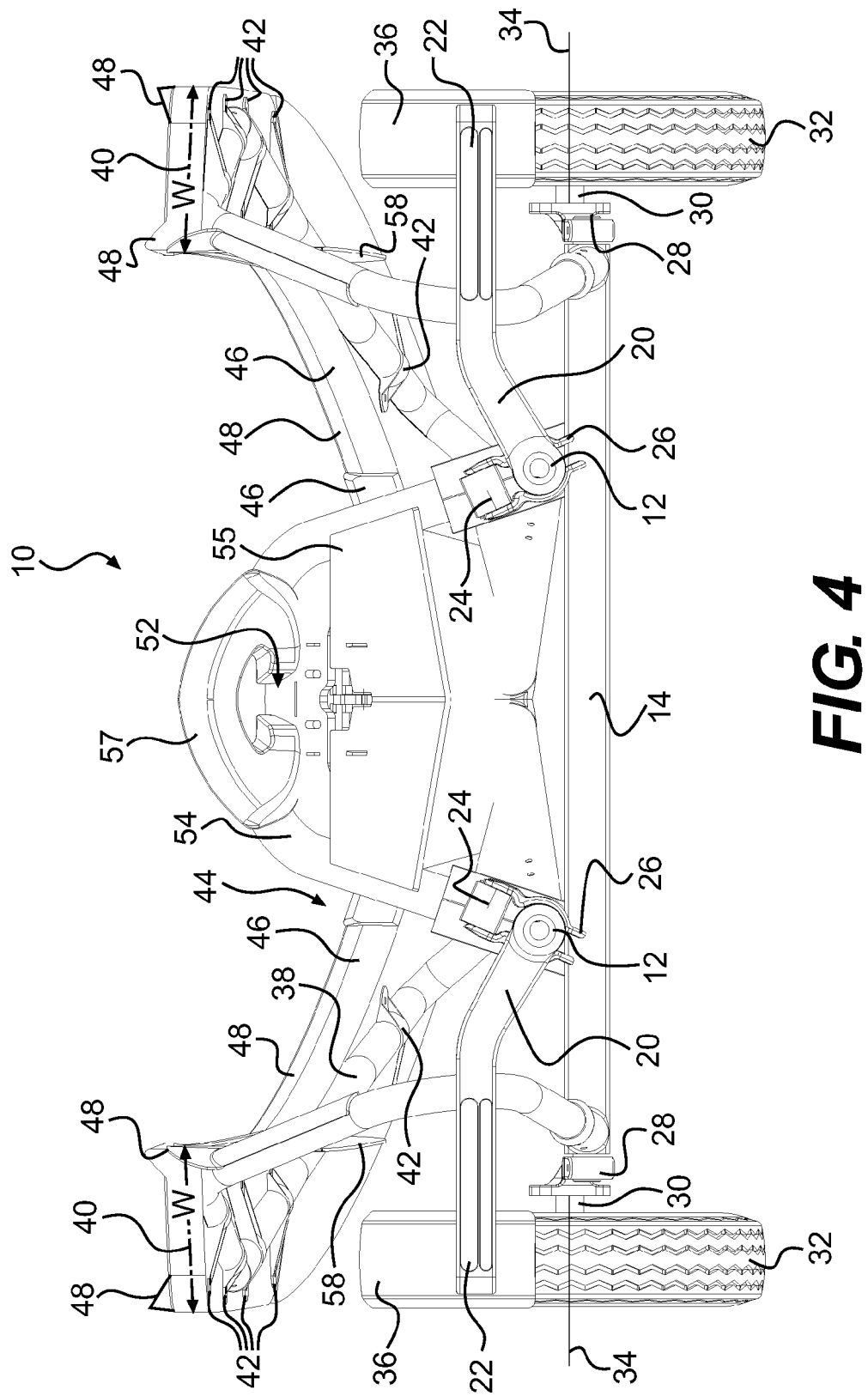
FIG. 4 is a rear elevation view of the trailer of FIG. 1.

Watercraft supporting members in the form of a plurality of low friction rollers 24 are connected to each of the longitudinally extending lower frame member 12 by brackets 26. The rollers 24 allow a watercraft for which the trailer 10 is adapted to easily slide in and out of the trailer 10. As best seen in FIG. 4, the rollers 24 are angled laterally inwardly. Angling the rollers 24 as shown makes the trailer 10 better adapted to receive watercraft having a V-shaped hull. The angle and position of the rollers 24 on the longitudinally extending lower frame members 12 can be adjusted to accommodate different watercraft. It is contemplated that the watercraft supporting members could alternatively be in the form of sliding boards or other structure to allow a watercraft to slide in and out of the trailer 10 with only moderate friction. It is also contemplated that the rollers 24 and brackets 26 could be omitted, in which case a watercraft would slide directly on the longitudinally extending frame members 12 and as such the longitudinally extending frame members 12 would act as the watercraft supporting members.

The laterally extending lower frame member 14 is disposed under the longitudinally extending lower frame members 12 and extends perpendicularly thereto. The laterally extending lower frame member 14 is connected the longitudinally extending lower frame members 12 by welding, bolts or other mechanical fasteners.

Figure 2:
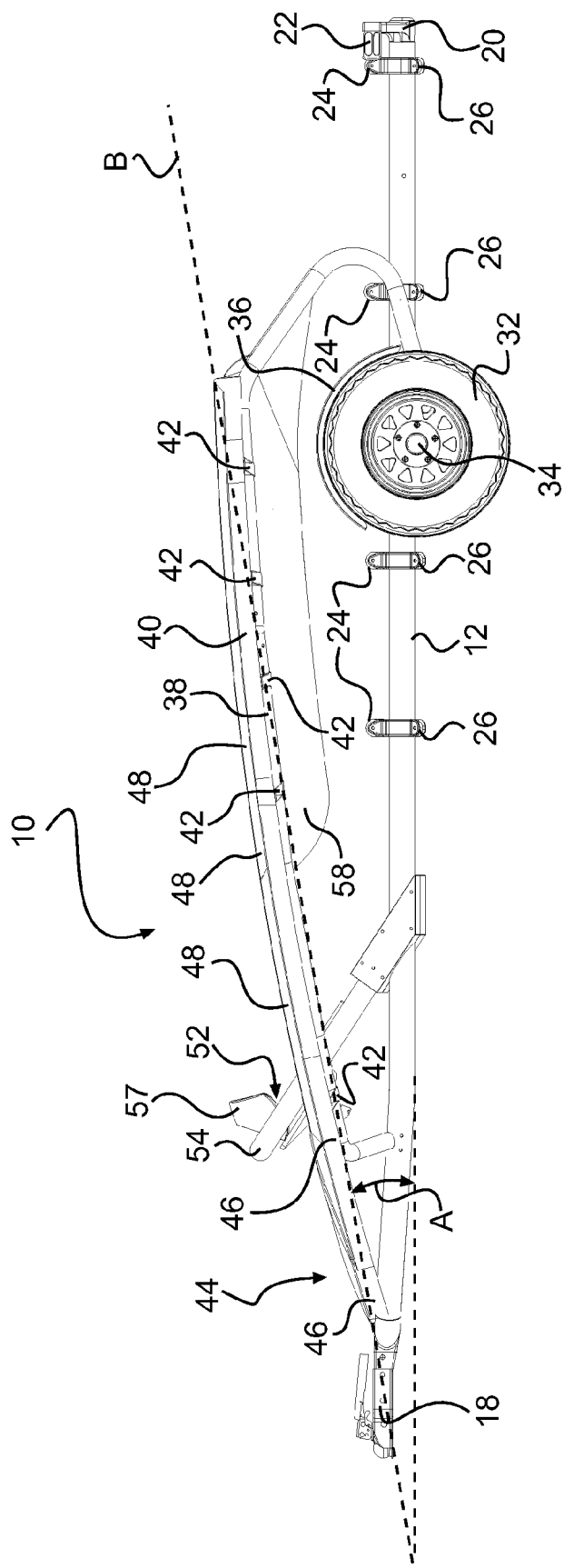
FIG. 2 is a left side elevation view of the trailer of FIG. 1.
Figure 3:
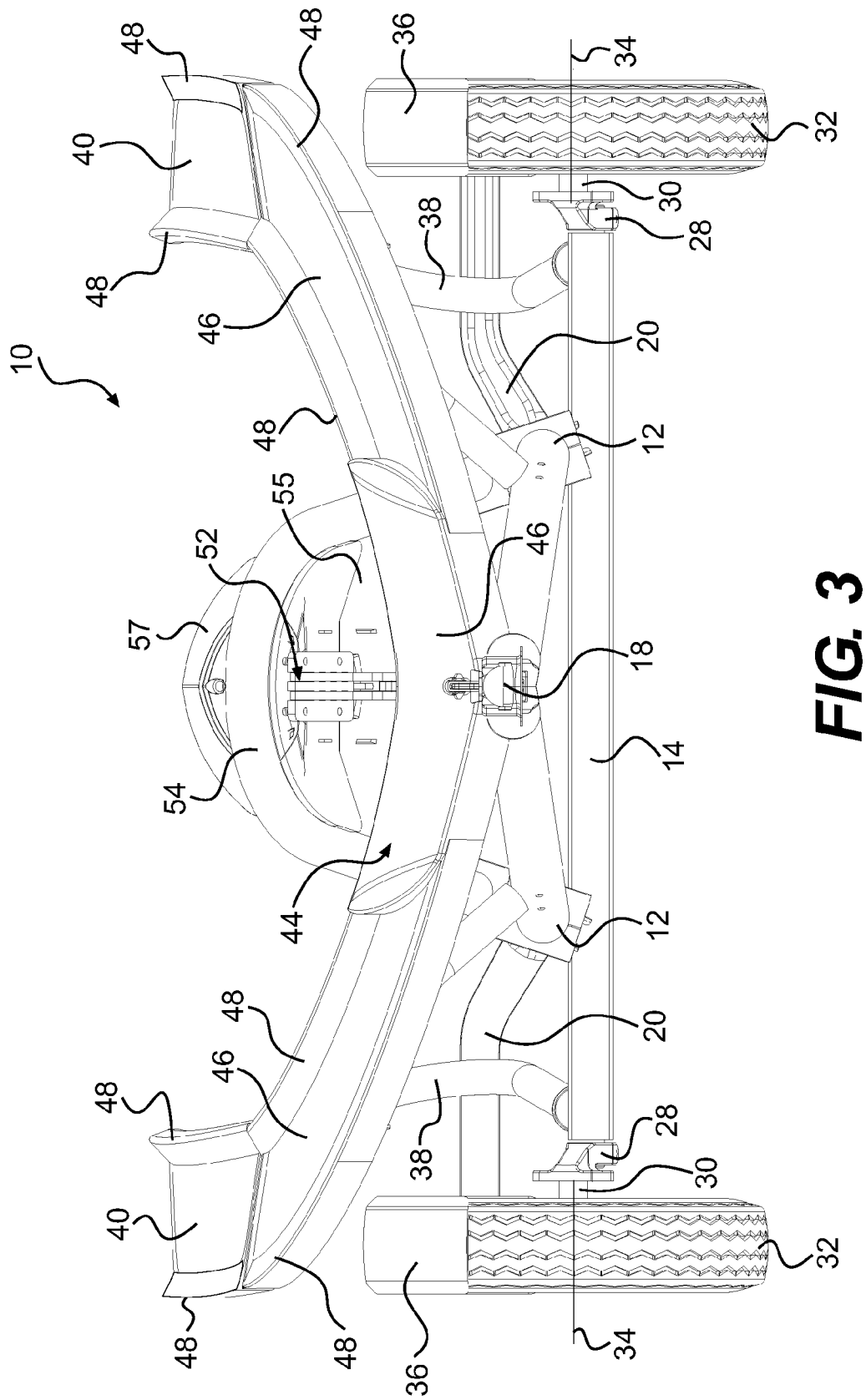
FIG. 3 is a front elevation view of the trailer of FIG. 1.

A wheel mount 28 is connected to each end of the laterally extending lower frame member 14 and extends forwardly therefrom. A wheel axle 30 (FIGS. 3 and 4) extends laterally outwardly from the forward end of each wheel mount 28. A wheel 32 is mounted to each wheel axle 30 for rotation about a wheel rotation axis 34 (FIG. 2). A fairing 36 is mounted over each wheel 32. The connections between the wheel mounts 28 and the laterally extending frame member 14 include elastomeric members (not shown) which allow for some torsion of the wheel mounts 28 relative to the laterally extending frame member 14, thus acting as a suspension for the trailer 10. It is contemplated that other type of suspensions could be used or that no suspension could be used. It is also contemplated that the wheels 32 could be mounted to the laterally extending frame member 14 such that the wheel rotation axis 34 could be in alignment with the laterally extending frame member 14 or disposed rearwardly of the laterally extending frame member 14.

The trailer 10 also has an upper frame having left and right upper frame members 38. The frame members 38 are preferably metal tubes, but other materials and shapes (beams for example) are contemplated. The rear ends of the upper frame members 38 are connected to the laterally extending lower frame member 14 at positions laterally outwardly of the longitudinally extending lower frame members 12. It is contemplated that the rear ends of the upper frame members 38 could be connected elsewhere on the lower frame, such as on the longitudinally extending lower frame members 12. The forward ends of the upper frame members 38 are connected to the front portions of their corresponding longitudinally extending lower frame members 12.

Figure 6:
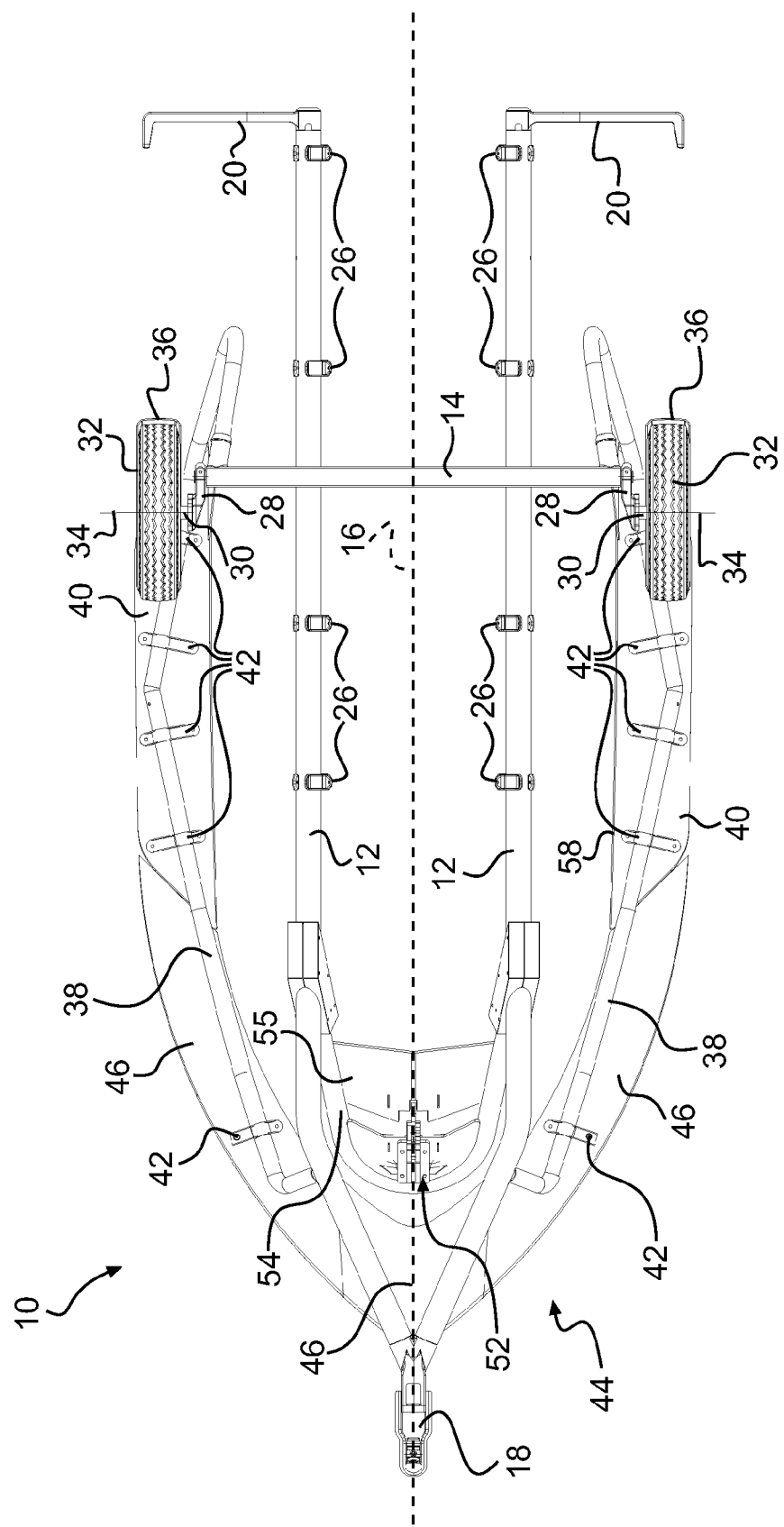
FIG. 6 is a bottom plan view of the trailer of FIG. 1.
Figure 7:
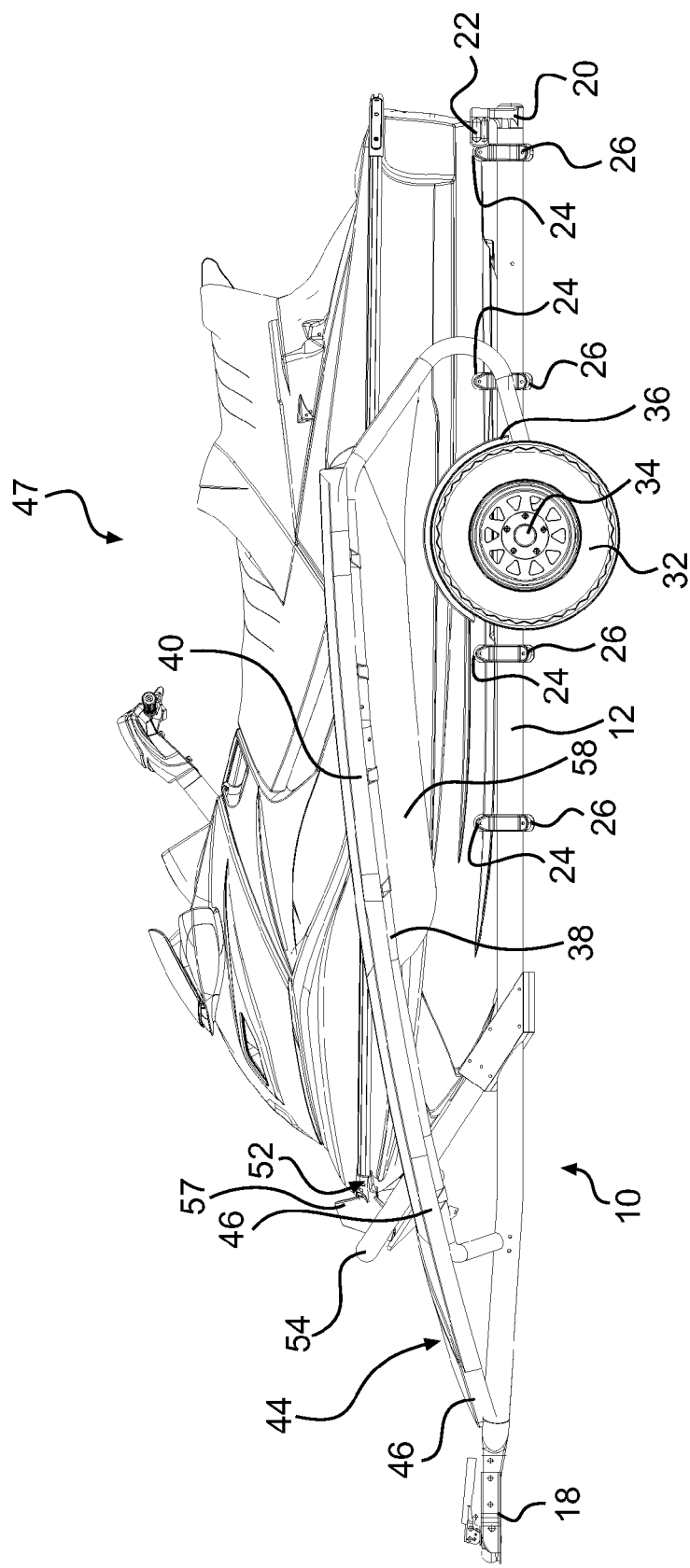
FIG. 7 is a left side elevation view of the trailer of FIG. 1 with a personal watercraft supported thereon.

The left upper frame member 38 supports a left walk board 40 which is held in place on the left upper frame member 38 by brackets 42 (FIG. 6). As can be seen, the left walk board 40 is disposed to the left of the left longitudinally extending lower frame member 12. Similarly, the right upper frame member 38 supports a right walk board 40 which is held in place on the right upper frame member 38 by brackets 42. As can also be seen, the right walk board 40 is disposed to the right of the right longitudinally extending lower frame member 12. The left and right walk boards 40 are mirror images of each other, however it is contemplated that they could not be. A generally U-shaped walk board 44 is disposed forwardly of the left and right walk boards 40. The rear of the generally U-shaped walk board 44 is supported by the left and right upper frame members 38 and the front of the generally U-shaped walk board 44 rests on the forward portions of the left and right longitudinally extending lower frame members 12 (see FIG. 2). The generally U-shaped walk board 44 is held onto the left and right upper frame members 38 by brackets 42. The rear ends of the U-shaped walk board 44 are disposed adjacent to the forward ends of the left and right walk boards 40 so as to form a continuous walk board. The generally U-shaped walk board 44 is made of three sections 46, but it is contemplated that it could be made of a single part, two sections, or more than three sections. Similarly, the left and right walk boards 40 could be made of multiple sections. It is also contemplated that the two walk boards 40 and the generally U-shaped walk board 44 could be integrally formed as a single part.

Figure 9:
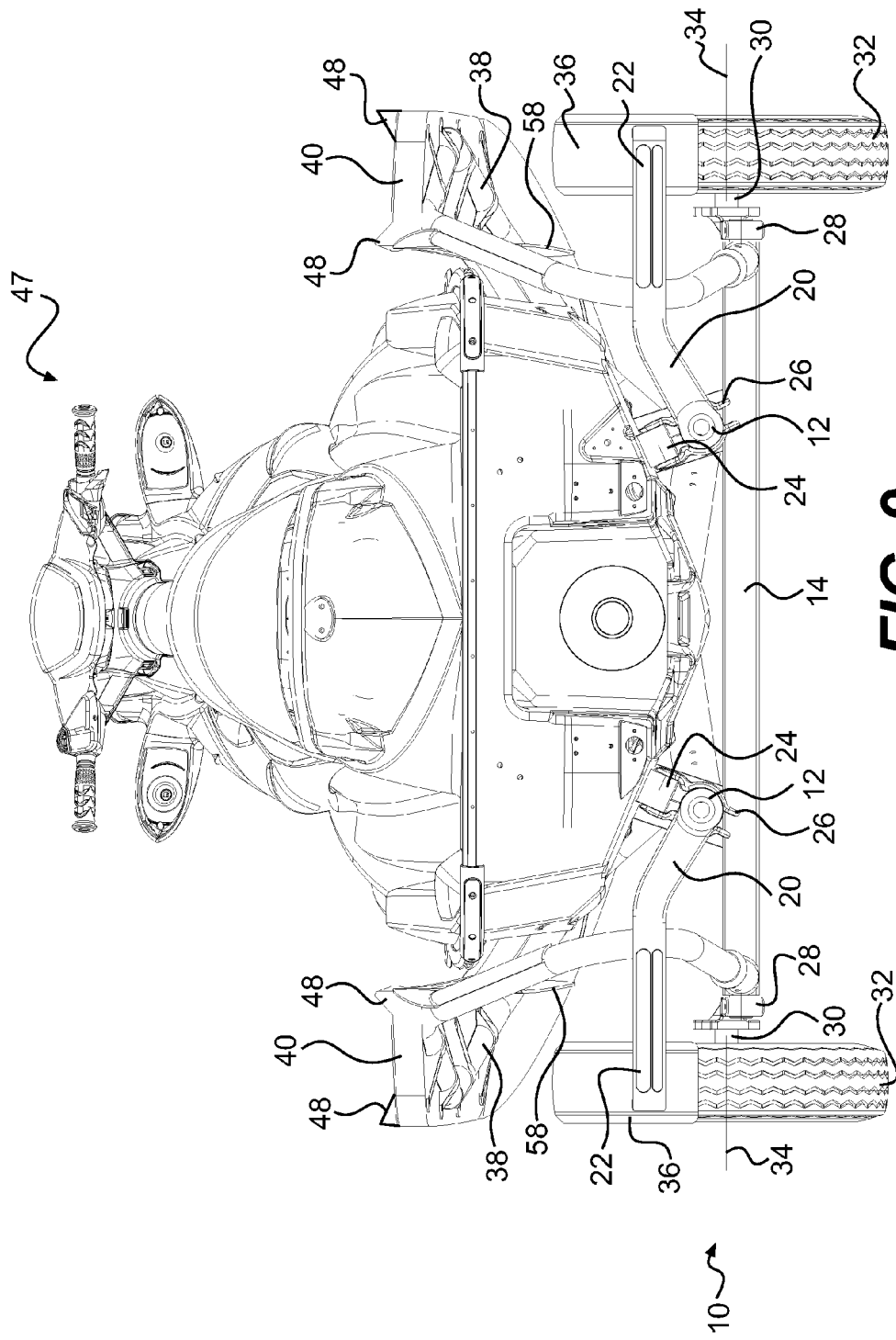
FIG. 9 is a rear elevation view of the trailer and watercraft of FIG. 7.
Figure 10:
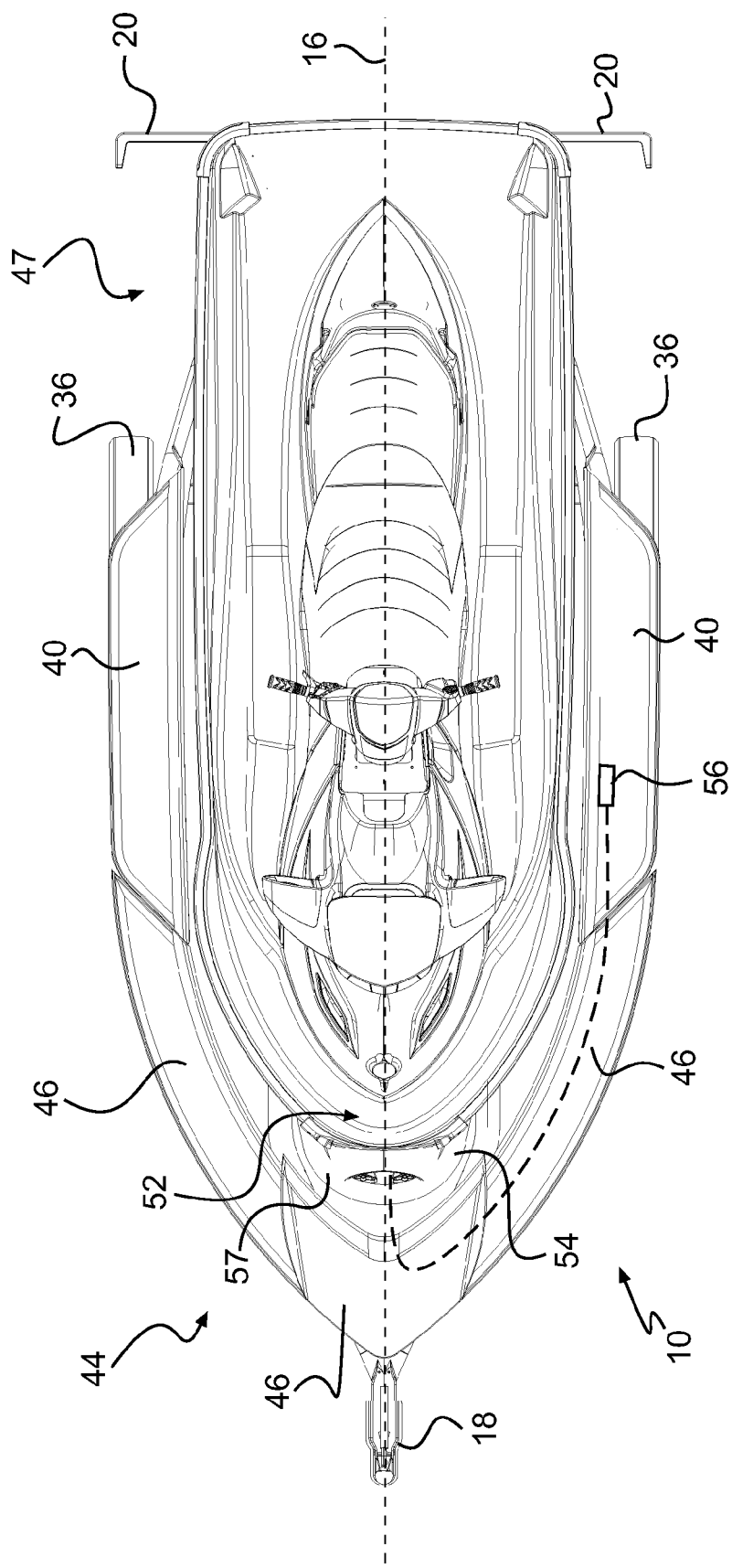
FIG. 10 is a top plan view of the trailer and watercraft of FIG. 7.

The inner edges of the walk boards 40 and of the generally U-shaped walk board 44 define therebetween a watercraft receiving portion. As seen in FIG. 10, a watercraft 47 received in the watercraft receiving portion occupies the majority of the watercraft receiving portion. The distance D (FIG. 5) between the inner edges of the left and right walk boards 40 is greater than or equal to a width of a watercraft for which the trailer 10 is adapted. For a trailer 10 for a personal watercraft, such as the personal watercraft 47 shown in FIGS. 7 to 10, the distance D is preferably at least 100 cm. It is contemplated however that the distance D could be less than a width of a watercraft for which the trailer 10 is adapted. This would be the case when the walk boards 40 are arranged so as to rest against a lower portion of the hull of the watercraft since the width of the hull generally decreases from its upper portion to the keel of the watercraft.

The walk boards 40, 44 provide surfaces onto which a person can walk when going from the watercraft 47 supported by the trailer 10 to the ground or vice versa. For this reason, the walk boards 40, 44 have generally horizontal upper surfaces in the lateral direction (see FIGS. 3 and 4 for example). In order to provide a sufficient surface onto which a person can step, a width W (FIG. 4) of the walk boards 40, 44 is at least 5 cm, but preferably at least 20 cm. To help prevent the feet of people walking on the walk boards 40, 44 from slipping off the walk boards 40, 44, the walk boards 40, 44 are provided with walls 48 extending upwardly from the inner and outer edges of the walk boards 40, 44. It is contemplated that the walls 48 could be provided only on the outer edges of the walk board 40, 44, only on the inner edges of the walk boards 40, 44, or completely omitted. It is also contemplated that only some of the walk boards 40, 44 could be provided with walls 48 or that only portions of the walk boards 40, 44 could be provided with walls 48. The upper surfaces of the walk boards 40, 44 are preferably textured to also help prevent the feet of people walking on the walk boards 40, 44 from slipping off the walk boards 40, 44. The texturing of the walk boards 40, 44 can be achieved by mixing an abrasive, such as sand, in the paint used to cover the walk boards 40, 44. Other ways of texturing the upper surfaces of the walk boards 40, 44 are also contemplated, such as by creating a raised pattern in the upper surfaces, or by applying a rubber-type carpet on the walk boards 40, 44.

Figure 8:
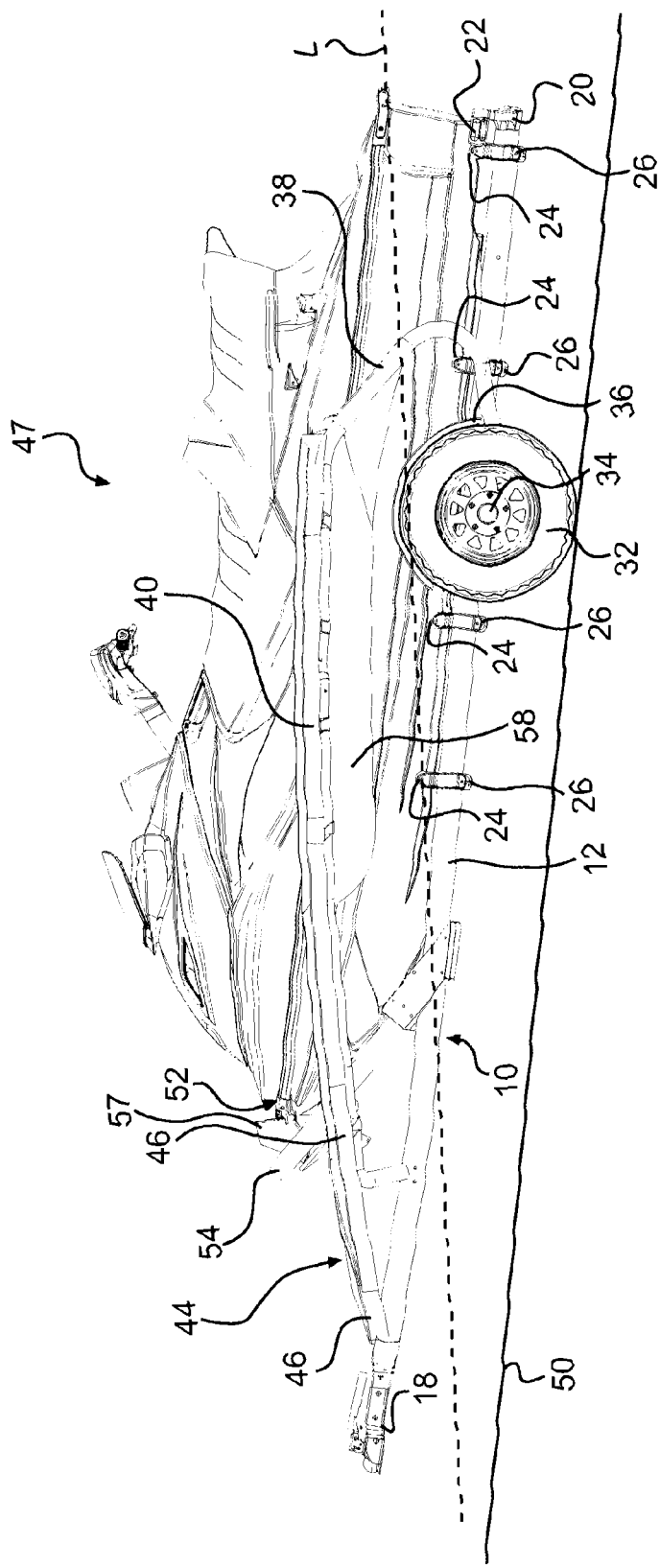
FIG. 8 is a left side elevation view of the trailer and watercraft of FIG. 7 with the trailer being disposed on a ramp.

In order to facilitate getting on or off the watercraft 47 when it is supported by the trailer 10, the walk boards 40, 44 are angled in a longitudinal direction relative to the lower frame members 12 such that a distance between the walk boards 40, 44 and the lower frame members 12 is shorter at a front of the walk boards 40, 44 than at a rear of the walk boards 40, 44, as seen in FIG. 2. By angling the walk boards 40, 44 as shown, when the trailer 10 is backed down a ramp 50 (either natural or man made) as shown in FIG. 8 in order to receive or launch the watercraft 47, the walk boards 40, 44 are generally horizontal thus providing a surface that can be easily walked on. A person getting off the watercraft 47 simply steps on one of the walk boards 40, walks towards a front of the trailer 10 along the walk board 40 and then the walk board 44, and finally steps down from the trailer 10 at a front thereof where there is no water or where the water is shallow (the water level is indicated by line L in FIG. 8). As would be understood, getting on the watercraft 47 from the shore is accomplished by doing the same steps in the reverse direction. Angling the generally U-shaped walk board 44 also reduces the distance from which a person has to step up to or down from the trailer 10 at a front thereof. The angle A (FIG. 2) between the longitudinally extending lower frame members 12 and a line B extending through the back of the walk board 40 and a front of the walk board 44 is preferably between 5 and 25 degrees.

It is contemplated that only one of the walk boards 40 could be used with the generally U-shaped walk board 44. It is also contemplated that generally U-shaped walk board 44 could be omitted and that only one or both walk boards 40 could be used, in which case the walk board(s) 40 would preferably be extended closer towards the front of the trailer 10. It is also contemplated that only the generally U-shaped walk board 44 could be used, in which case the generally U-shaped walk board 44 would preferably be extended further back. In any one of these alternative embodiments, the angle between the longitudinally extending lower frame members 12 and a line extending through the back of the walk board(s) 40 and/or 44 being used and a front of the walk board(s) 40 and/or 44 being used is also preferably between 5 and 25 degrees. By having walk boards 40 and/or 44 only along one side of the trailer 10, the overall width of the trailer 10 can be reduced.

As can best be seen in FIG. 2, when viewed from a side elevation view of the trailer 10, the walk boards 40, 44 preferably have a non-linear profile, although linear profiles are contemplated. The non-linear profile is preferably a convex profile. By having a non-linear profile, the range of ramp angles for which at least a portion of the walk boards 40, 44 will provide adequate walking surfaces is increased. For example, if the walk boards 40, 44 have a linear profile and are disposed at an angle A of 15 degrees, they will provide adequate walking surfaces for ramp angles between approximately 12 to 18 degrees. However, if the walk boards 40, 44 have different portions for which the angle between each portion and the longitudinally extending lower frame members 12 varies between 10 and 20 degrees, at least a portion of the walk boards 40, 44 will provide adequate walking surfaces for ramp angles between approximately 7 and 23 degrees (as would be understood, the portion providing adequate walking surfaces at a ramp angle of 23 degrees will be different from the portion providing these surfaces at a ramp angle of 7 degrees).

At least a portion of the walk boards 40 is at least 35 cm vertically above the watercraft supporting members (i.e. rollers 24 in this embodiment) when the longitudinally extending lower frame members 12 are horizontal as shown in FIG. 2. By having a portion of the walk boards 40 sufficiently raised above the watercraft supporting members, the distance by which the trailer 10 can be lowered down the ramp 50 can be increased while still keeping the walk boards 40 above the water level L. Having a portion of the walk boards 40 sufficiently raised above the watercraft supporting members also facilitates getting on or off the watercraft 47 as the distance between the walk boards 40 and the surfaces on which a person would step on in the watercraft 47 is reduced (see FIGS. 7 to 9). Also, having a portion of the walk boards 40 sufficiently raised above the watercraft supporting members allows the walk boards 40 to be used to guide the watercraft 47 into the watercraft receiving portion as discussed below.

Figure 5:
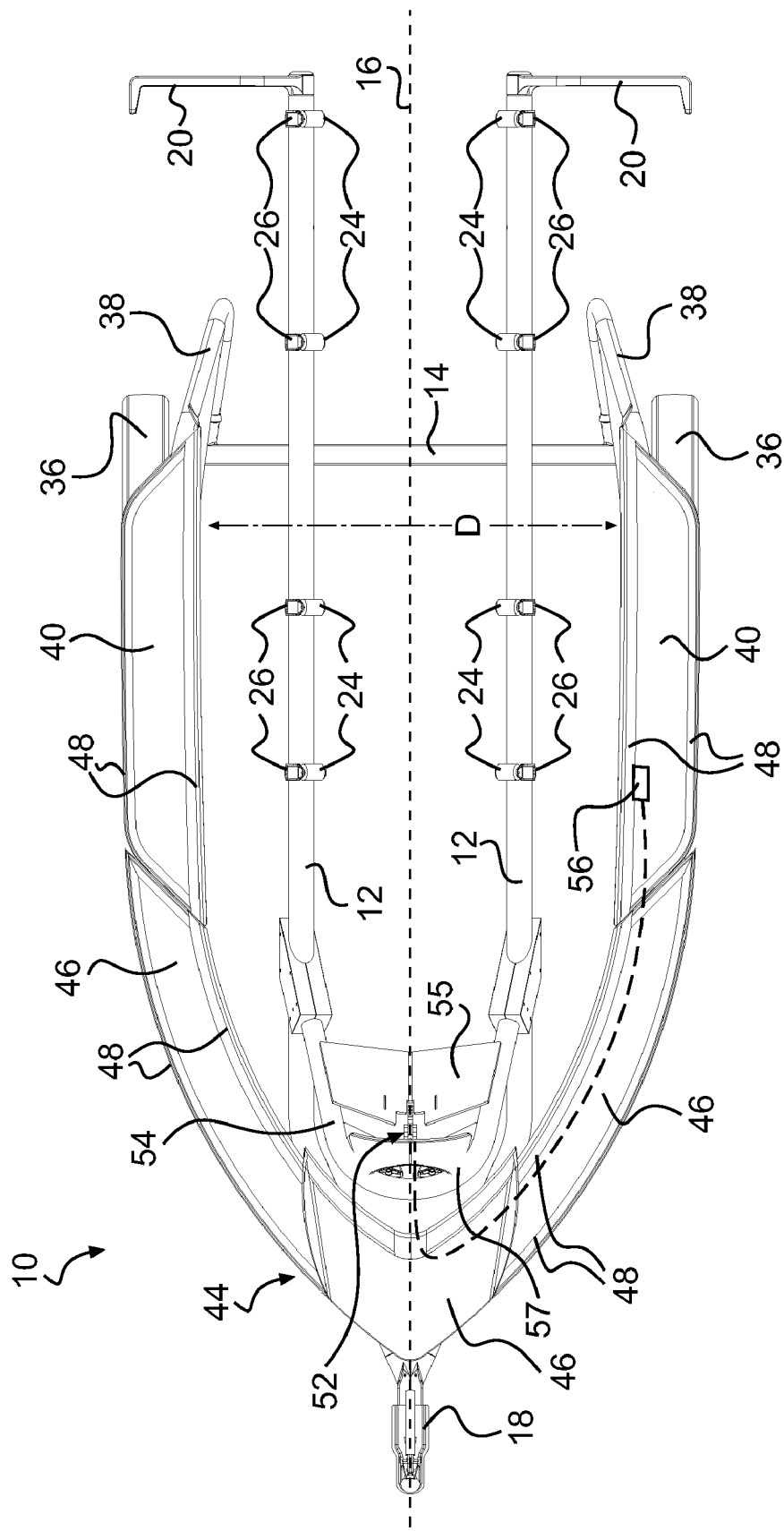
FIG. 5 is top plan view of the trailer of FIG. 1.

As best seen in FIGS. 1, 4, and 5, the trailer 10 is provided with a releasable connector 52 for connecting the watercraft 47 to the trailer 10. The releasable connector 52 is disposed on the longitudinal centerline of the watercraft receiving portion (which in this case corresponds to the longitudinal centerline 16 of the trailer 10) at a front of the watercraft receiving portion. The releasable connector 52 is supported by a connect support in the form of bow stop bar 54. The bow stop bar 54 is an inverted U-shaped tubular member having its ends connected to the longitudinally extending lower frame members 12. A plate 55 is connected between the arms of the bow stop bar 54. A bumper 57 is connected to the top of the bow stop bar 54 above the releasable connector 52. The bumper 57 is preferably made of close-cell foam, however other materials are contemplated. The releasable connector 52, the bow stop bar 54, the plate 55, and the bumper 57 together form a connector assembly. When the watercraft 47 enters the watercraft receiving portion, the bumper 57 absorbs the initial impact of the watercraft 47 with the trailer 10 and stops the forward movement of the watercraft 10. As the watercraft 47 comes into contact with the bumper 57, the watercraft 47 engages the releasable connector 52 as shown in FIG. 8, and the releasable connector 52 automatically clamps onto the watercraft 47 thereby securing the watercraft 47 to the trailer 10. The releasable connector 52 will be described in greater detail below. An actuator 56, in the form of a lever, a handle, a button, or a switch, is mechanically or electrically connected to the releasable connector 52. Actuating the actuator 56 causes the releasable connector 52 to release the watercraft 47, thereby allowing the watercraft 47 to be launched from the trailer 10. For example, the actuator 56 could be a handle connected via a cable to the releasable connector 52 such that pulling on the handle pulls on the cable which causes the releasable connector 52 to release the watercraft 47. Alternatively, the actuator 56 could be a button connected via an electrical wire to a solenoid actuator operatively connected to the releasable connector 52 such that pushing the button actuates the solenoid actuator which causes the releasable connector 56 to release the watercraft 47. The actuator 56 is preferably disposed on one side of the watercraft receiving portion such that a person on the watercraft 47 can reach the actuator 56 to release the watercraft 10 while being on the watercraft.

The inner edges of the walk boards 40 act as guides for aligning the watercraft 47 with the watercraft receiving portion when the watercraft 47 is being driven onto the trailer 10. In order to increase the guiding surface, and to prevent the watercraft 47 from becoming stuck under the walk boards 40, walls 58 extend downwardly from the inner edges of the walk boards 40. If the watercraft 47 is driven out of alignment into the watercraft receiving portion, the walk boards 40 will cause it to become aligned between the longitudinally extending lower frame members 12 as the watercraft continues to move forward, until the watercraft 47 becomes supported by the rollers 24 (and therefore by the lower frame as seen in FIG. 9), and the watercraft 47 is finally connected to the trailer by the releasable connector 52.

It is contemplated that the angled walk boards 40, 44 used on the trailer 10 could be used on a trailer having two watercraft receiving portions disposed side by side in order to accommodate two watercraft, similar to the trailer 100 described below. Such a trailer would have one walk board 40 disposed on each side of the trailer and another walk board 40 disposed on the center which would be in common for both watercraft receiving portions. Two generally U-shaped walk boards 44 would be provided side-by-side or, alternatively, a single W-shaped walk board. It is contemplated that in an alternative embodiment, no central walk board 40 would be provided. It is also contemplated that in another alternative embodiment, only the central walk board 40 would be provided. By having fewer than three walk boards 40, the overall width of the trailer 10 can be reduced.

Figure 11:
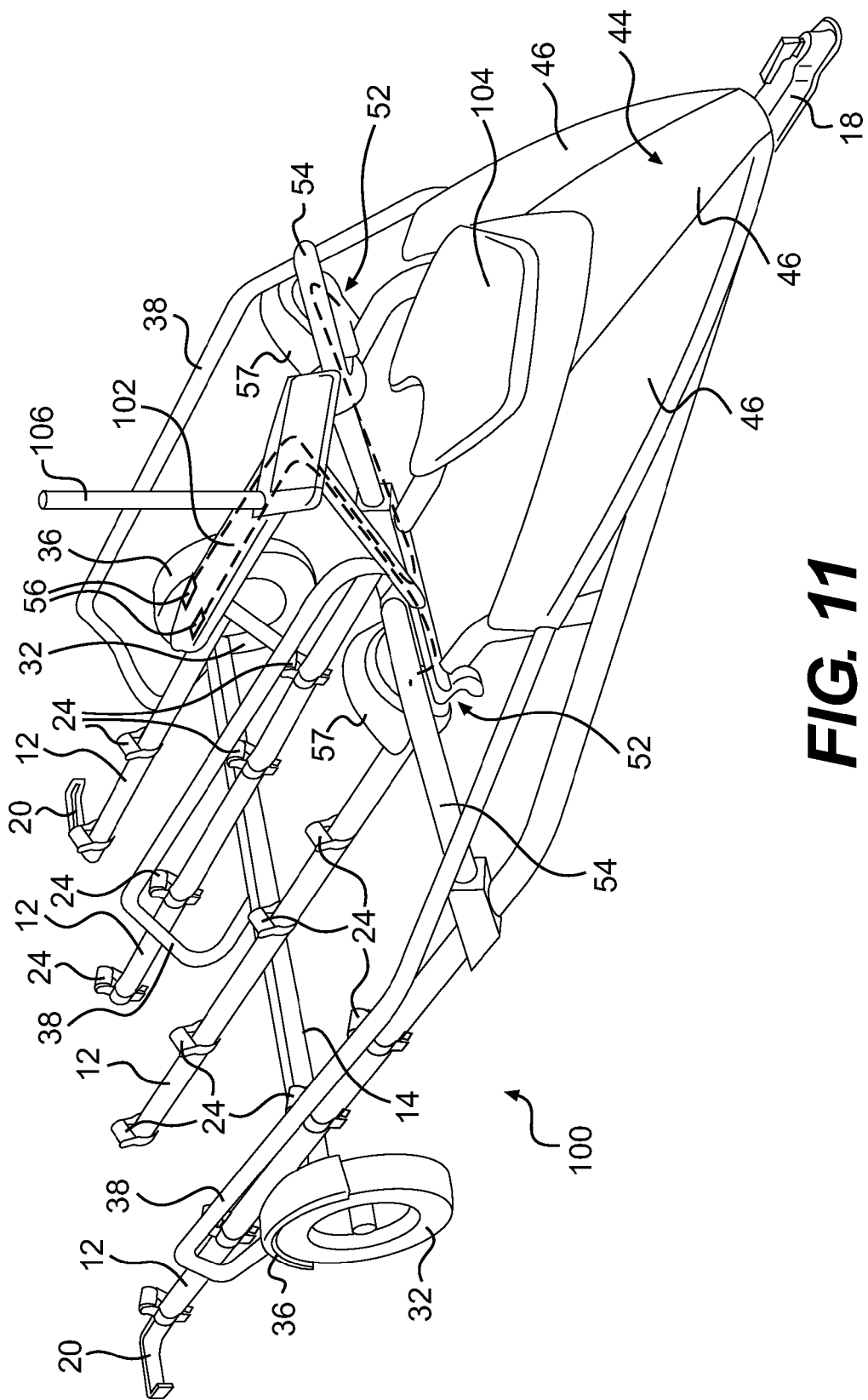
FIG. 11 is a perspective view, taken from a front, right side, of a second embodiment of a watercraft trailer.
Figure 12:
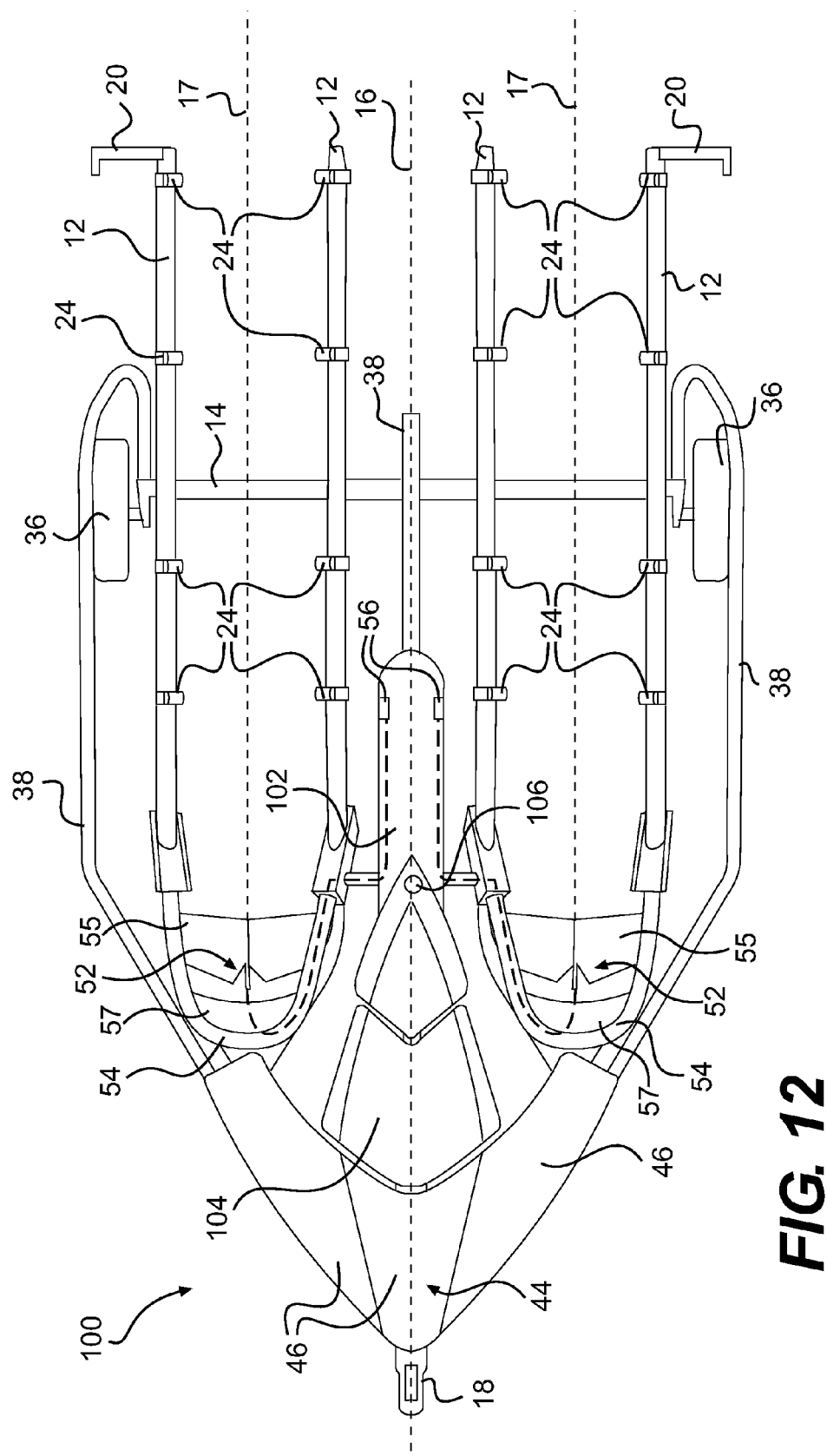
FIG. 12 is a top plan view of the trailer of FIG. 11.
Figure 13:
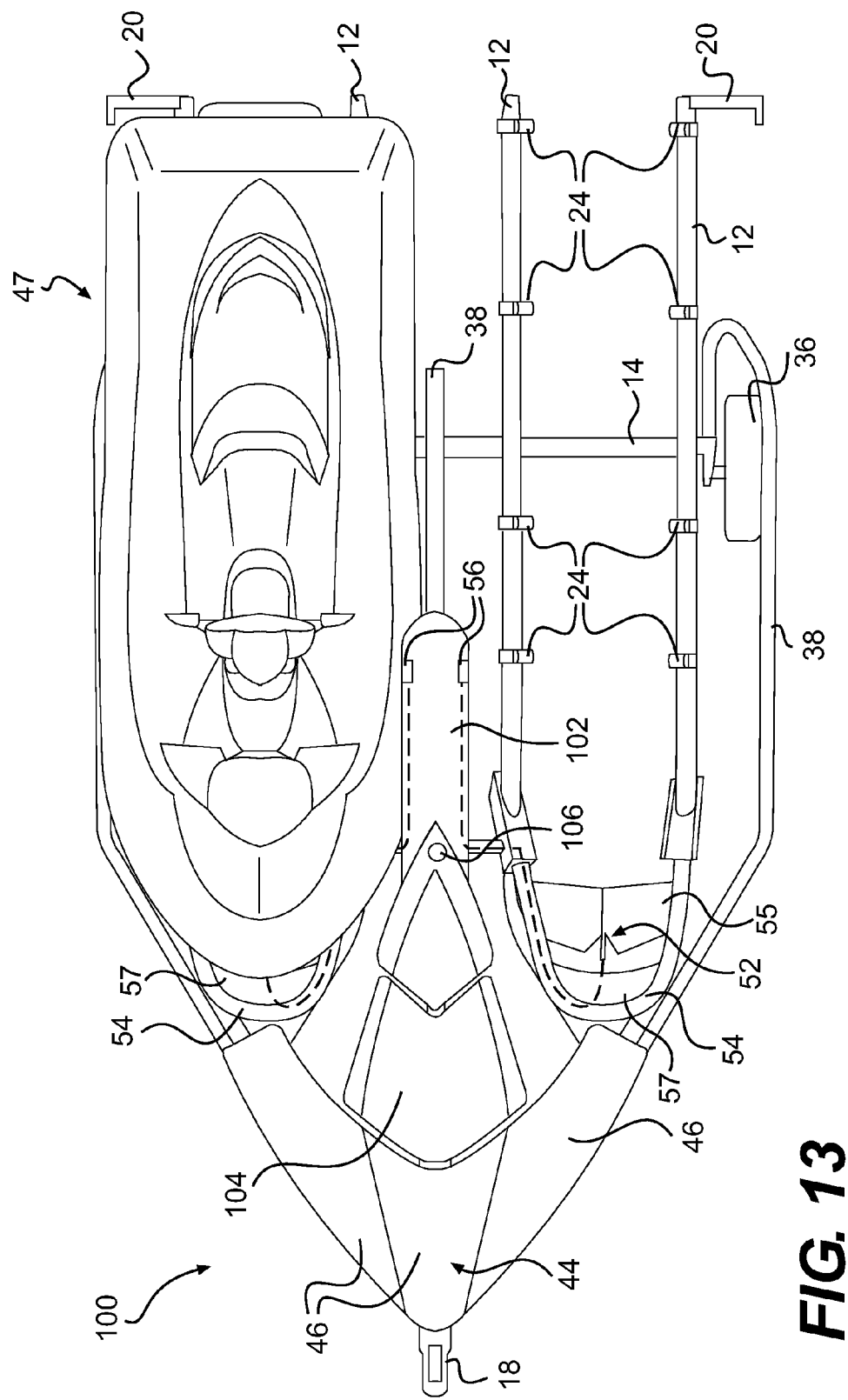
FIG. 13 is top plan view of the trailer of FIG. 11 with a personal watercraft supported thereon.

Turning now to FIGS. 11 to 13, a watercraft trailer 100 will be described. For simplicity, the features and components of the trailer 100 which are similar to those of the trailer 10 have been labelled with the same reference numeral and will not be described again below.

As can be seen, the trailer 100 is adapted to transport two watercraft such as watercraft 47 (FIG. 13). As such, the trailer 100 has a right and a left upper frame member 38, and a central upper frame member 38 disposed on the longitudinal centerline 16 of the trailer. The right and central upper frame members 38 define a right watercraft receiving portion therebetween, and the left and central upper frame members 38 define a left watercraft receiving portion therebetween. Each watercraft receiving portion has a longitudinal centerline 17. The trailer 100 has four longitudinally extending lower frame members 12 arranged as shown and a single laterally extending lower frame member 14 to connect the two wheels 32. Only the two laterally outermost longitudinally extending lower frame members 12 are provided with brackets 20. Each watercraft receiving portion has a releasable connector 52 supported on the longitudinal centerline 17 thereof by bow stop bar 54. Each releasable connector 52 has an actuator 56 associated therewith. The actuators 56 are disposed on the walk board 102 (described below). A generally U-shaped walk board 44 is disposed at the front of the trailer 100 and is supported in part by the left and right upper frame members 38.

In trailer 100, the walk boards 40 have been replaced by a walk board 102 and a step 104 described in greater detail below. Since the walk boards 40 are no longer present, it is the upper frame members 38 that provide the guiding feature that was provided by the walk boards 40 in the trailer 10.

The walk board 102 and step 104 are supported by the central upper frame member 38, and as such can be used by a person getting on or off a watercraft disposed in either one of the watercraft receiving portions. The step 104 is disposed at least in part forwardly of the walk board 102 and at a vertically lower position than the walk board 102. Similarly, the generally U-shaped walk board 44 is disposed at least in part forwardly of the step 104 and at a vertically lower position than the step 104. As such, the walk board 102, the step 104, and the generally U-shaped walk board 44 act as stairs which permit a person to easily get from a watercraft supported in the trailer 100 to the ground and vice versa. It is contemplated that the generally U-shaped walk board 44 could be omitted, in which case the step 104 would preferably extend closer to the front of the trailer 100. It is also contemplated that the right and left upper frame members 38 could also each be provided with a walk board 102 and a step 104.

Like the walk boards 40, the walk board 102 and the step 104 are at least 5 cm wide. In the embodiment shown, the step 104 is wider than the walk board 102, and the generally U-shaped walk board 44 is wider than the step 104. This allows a person stepping down from the trailer 100 to move laterally away from the longitudinal centerline 16, thus avoiding stepping on the hitch coupler 18.

Similarly to the walk boards 40, the upper surfaces of the walk board 102 and step 104 are preferably textured to help prevent the feet of people walking on the walk board 102 and step 104 from slipping off the walk board 102 and step 104. A pole 106 extending vertically upwardly form the walk board 102 can be grabbed by a person walking on the walk board 102 and the step 104, which can also help prevent a person from slipping off the walk board 102 and step 104.

It is contemplated that one or both walk boards 40 of the trailer 10 described above could be replaced by the walk board 102 and step 104.

Figure 14:
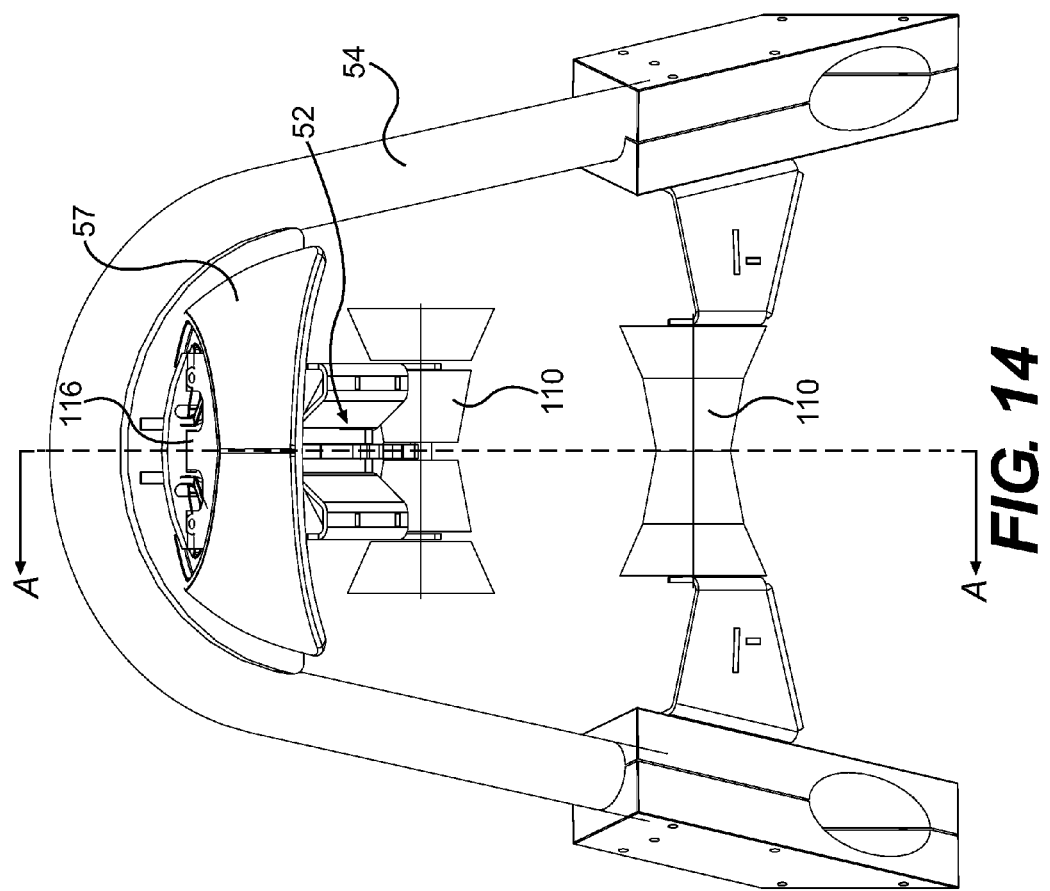
FIG. 14 is a top view of an alternative embodiment of the connector assemblies of the trailers shown in FIGS. 1 to 13.
Figure 15:
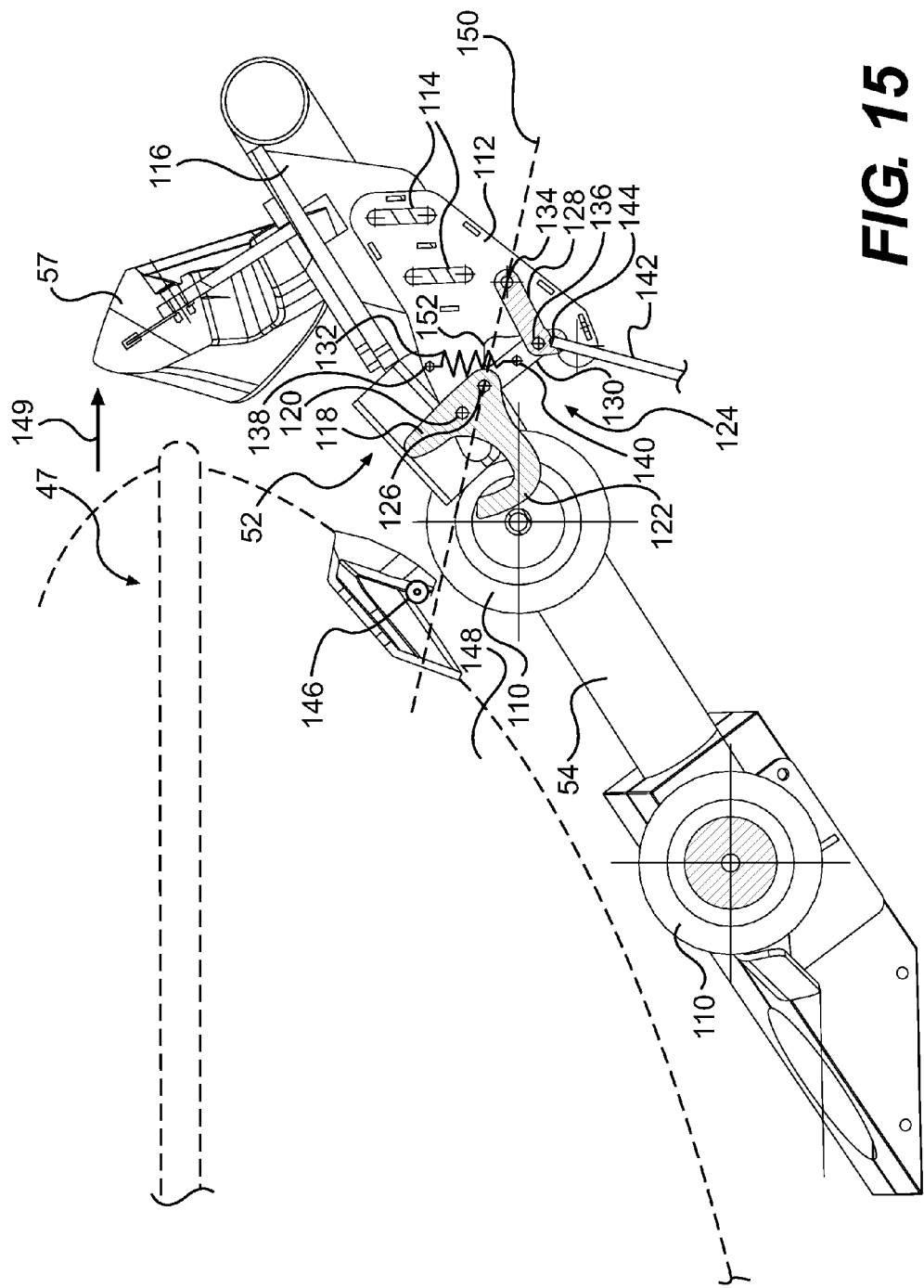
FIG. 15 is a cross-sectional view taken through line A-A of FIG. 14 of the connector assembly of FIG. 14 with a releasable connector in an unlocked position.
Figure 16:
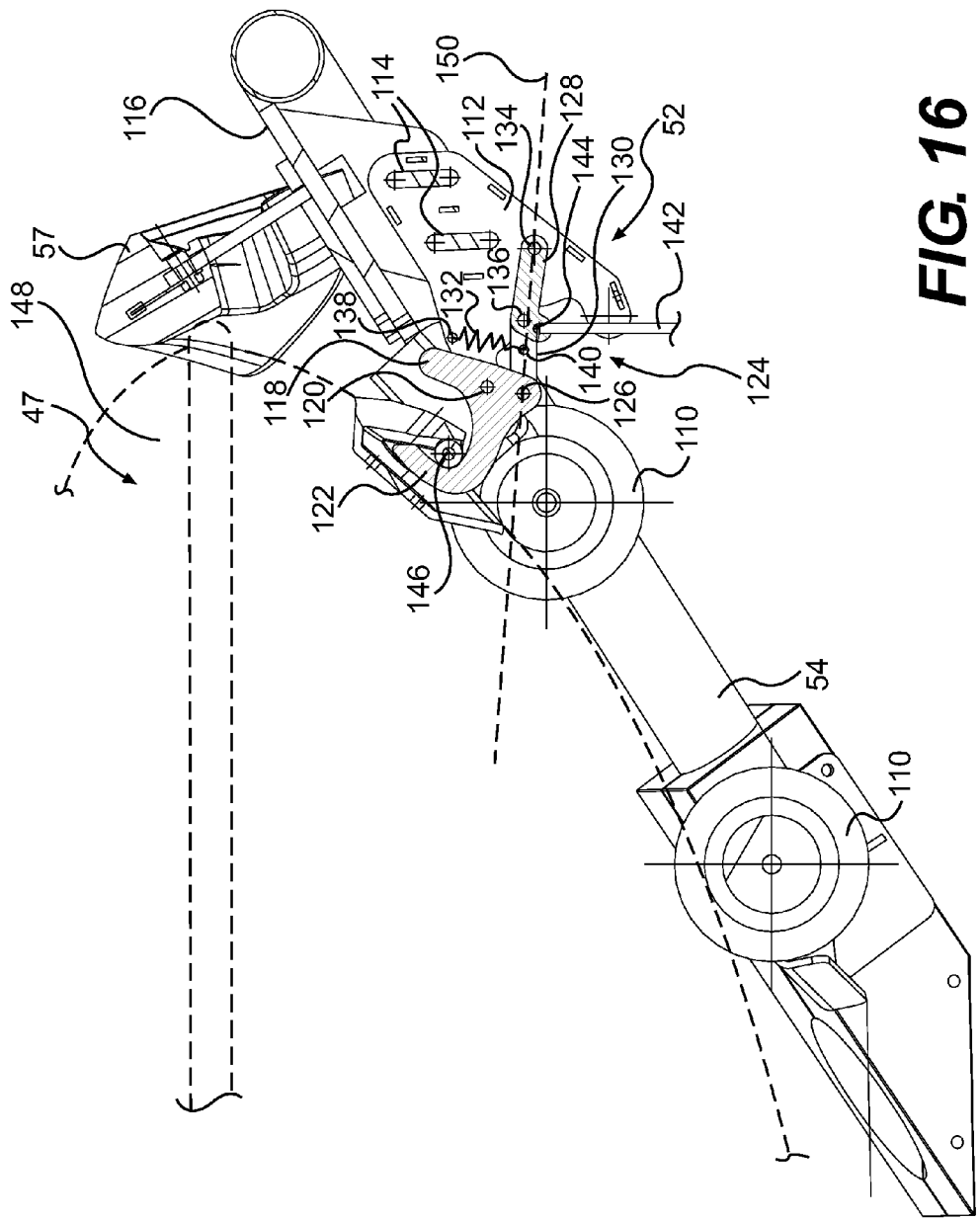
FIG. 16 is a cross-sectional view taken through line A-A of FIG. 14 of the connector assembly of FIG. 14 with the releasable connector in a locked position.

Turning now to FIGS. 14 to 16, an alternative embodiment of a connector assembly will be described. As with the connector assemblies shown in FIGS. 1 to 13, the connector assembly of FIGS. 14 to 16 has a releasable connector 52 connected to a bow stop bar 54, and a bumper 57 is connected to the bow stop bar 54. However, the plate 55 has been replaced by two rollers 110. One of the rollers 110 is connected between the arms of the bow stop bar 54. The other of the rollers 110 is connected to an upper portion of the bow stop bar 54. As would be understood, the connector assembly of FIGS. 14 to 16 can be provided on the trailers 10 and 100.

A pair of plates 112 are connected to the bow stop bar 54 (only one plate 112 is shown in FIGS. 15 and 16, however the second plate 112 is located on the other side of line A-A). The plates 112 together with the bow stop bar 54 form the connector support to which the releasable connector 52 is connected. More specifically, the releasable connector 52 is disposed between the plates 112. Slots 114 are provided in the plates 112 to fasten the plates 112 to a bracket 116 which is itself connected to the bow stop bar 54. The slots 114 allow the connection between the plates 112 and the bow stop bar 54 to be adjusted, which in turn adjusts the position of the releasable connector 52 to be adjusted. This allows the releasable connector 52 to be used with watercraft of different sizes.

The releasable connector 52 has a lever 118 pivotally connected to the plates 112 about a pivot axis 120. As explained in greater detail below, when a watercraft is driven inside the watercraft receiving portion, the hull of the watercraft makes contact with end of the lever 118 to move the releasable connector 52 to a locked position. For this reason, it is contemplated that at least the end of the lever 118 could be made of low friction material, such as ultra-high molecular weight polyethylene (UHMWPE), to reduce the friction between the hull of the watercraft and the lever 118. A hook 122 is integrally formed with the lever 118 and as such, is pivotable about the pivot axis 120 together with the lever 118. It is contemplated that the hook 122 and the lever 118 could be different parts that are otherwise connected together.

A locking mechanism, in the form of an overcentering mechanism 124, described in greater detail below, is connected to the lever 118 and the hook 122 at a pivot axis 126 that is offset from the pivot axis 120. The locking mechanism locks the hook 122 in position once the hook 122 has pivoted to a locked position of the releasable connector 52 (i.e. the position of the hook 122 shown in FIG. 16). It is contemplated that in the case where the lever 118 and the hook 122 are separate parts that the locking mechanism could be directly connected to only one of the lever 118 and the hook 122. It is also contemplated that other types of locking mechanisms could be used. For example, the locking mechanism could be a spring loaded pin that would engage an aperture in one of the plates 112 once the hook 122 has pivoted to the locked position of the releasable connector 52, thus locking the hook 118 in position. Pulling the pin from the aperture would then allow the hook 118 to be pivoted to an unlocked position of the releasable connector 52 (i.e. the position of the hook 122 shown in FIG. 15).

The overcentering mechanism 124 includes a lever 128, a pair of levers 130, and a spring 132. One end of the lever 128 is pivotally connected to the plates 112 about a pivot axis 134. The first ends of the pair of levers 130 (only one shown in the Figures) are pivotally connected on either side of the other end of the lever 128 about a pivot axis 136. The second, opposite, ends of the pair of levers 130 are pivotally connected on either side of the lever 118 and the hook 122 about the pivot axis 126. The spring 132 has one end connected to an aperture 138 in one of the plates 112 and the other end connected to an aperture 140 in one of the levers 130 near a center thereof. As will be explained below, the spring 132 is in tension regardless of a position of the one of the levers 130 to which it is connected.

A cable 142 has one end connected at a point 144 on the lever 128 near the pivot axis 136. Alternatively, the end of the cable 142 could be connected at a point on one or both of the levers 130 near the pivot axis 136. The opposite end of the cable is connected to the actuator 56 provided to one side of the watercraft receiving portion rearwardly of the connector support. As previously mentioned, the actuator could be a handle. As will be described in greater detail below, actuating the actuator 56 pulls on the cable 142 which moves the overcentering mechanism 124 from a locked position (shown in FIG. 16) to an unlocked position (shown in FIG. 15). As previously mentioned, the cable 142 could be replaced with another device to apply a force at or near the pivot axis 136 to move the overcentering mechanism 124 from the locked position to the unlocked position. For example, the cable 142 could be replaced with a linear actuator such as a solenoid or a hydraulic cylinder, in which case the actuator 56 would be a switch that, once actuated, would send a signal to the solenoid or the hydraulic cylinder to unlock the overcentering mechanism 124.

The operation of the releasable connector 52 will now be explained in greater detail with reference to FIGS. 15 and 16. For simplicity, the directions of rotation of the various elements of the releasable connector 52 will be described as they would be understood by looking at these Figures.

The watercraft 47 to be secured to a trailer provided with the releasable connector 52 is provided with a laterally extending pin 146 connected to a bow portion of a hull 148 of the watercraft 47.

When the releasable connector 52 is in the unlocked position, the lever 118 and the hook 122 are in the position shown in FIG. 15. The position of the releasable connector 52 needs to be manually adjusted using the slots 114 in the plates 112 such that when the releasable connector 52 is in the unlocked position, the laterally extending pin 146 of the watercraft 47 is slightly above the upper end of the hook 122 as the watercraft 47 is being driven into the watercraft receiving portion of the trailer toward the releasable connector 52. This adjustment only needs to be made once as long as the trailer is to be used with the watercraft 47. If the trailer is to be used with another watercraft, the position of the releasable connector may need to be readjusted if the position of the pin 146 on the other watercraft is a different vertical position relative to the trailer.

When the releasable connector 52 is in the unlocked position, the overcentering mechanism 124 is also in an unlocked position as shown in FIG. 15. When the overcentering mechanism 124 is in the unlocked position, the levers 128 and 130 are arranged such that the pivot axis 136 is disposed below a line 150 passing through the pivot axes 126 and 134. Also, when the releasable connector 52 is in the unlocked position, the lever 118, the hook 122, and the levers 140 are arranged such that the pivot axis 126 is disposed above a line (not shown) passing through the pivot axes 120 and 136. Since the pivot axis 126 is disposed above the line passing through the pivot axes 120 and 136, the tension in the spring 132 biases the releasable connector 52 towards the unlocked position. In this position, the ends of the levers 130 near the pivot axis 126 abut a seat (not shown) in the plates 112 thus preventing the lever 118 and the hook 122 from pivoting counter-clockwise (CCW) about the pivot axis 120.

As the watercraft 47 moves towards the releasable connector 52 in the direction of arrow 149, the hull 148 eventually makes contact with the end of the lever 118. This pivots the lever 118 and the hook 122 clockwise (CW) about the pivot axis 120 (i.e. towards a front of the trailer, to the right of FIGS. 15 and 16). As a result, the lever 128 pivots CW about the pivot axis 134 and the levers 130 pivot CCW and translate between the pivot axes 126 and 136. As the lever 118 and the hook 122 continue to pivot CW, the pivot axis 126 is eventually disposed below the line (not shown) passing through the pivot axes 120 and 136. Once this occurs, the tension in the spring 132 biases the releasable connector 52 towards the locked position shown in FIG. 16 and thus assists in the continued pivoting of the lever 118, the hook 122, the lever 128, and the levers 130 in the directions indicated above.

As the lever 118, the hook 122, the lever 128, and the levers 130 continue to pivot in the directions indicated above, the pivot axis 136 is eventually on the line 150 passing through the pivot axes 126 and 134. This is a neutral or center position of the overcentering mechanism 124. As the lever 118, the hook 122, the lever 128, and the levers 130 continue to pivot in the directions indicated above from the neutral position of the overcentering mechanism 124, the pivot axis 136 is eventually disposed above the line 150 passing through the pivot axes 126 and 134, hence the name overcentering mechanism (i.e. a mechanism where the central pivot axis moves from one side of a line passing through the end pivot axes to the other side of the line).

The lever 118, the hook 122, the lever 128, and the levers 130 continue to pivot in the directions indicated above until the ends of the levers 130 near the pivot axis 136 abut a seat 152 (FIG. 15) in the plates 112 as shown in FIG. 16. This position of the lever 118, the hook 122, the lever 128, and the levers 130 corresponds to the locked position of the releasable connector 52. Since the pivot axis 126 is disposed below the line passing through the pivot axes 120 and 136, the tension in the spring 132 biases the releasable connector 52 towards the locked position. As can be seen by comparing FIGS. 15 and 16, the normal distance between the pivot axis 136 and the line 150 (i.e. the length of a line extending from the pivot axis 136 to the line 150 perpendicularly to the line 150) is greater in when the releasable connector 52 is in the unlocked position (FIG. 15) than when the releasable connector 52 is in the locked position (FIG. 16).

In the locked position of the releasable connector 52, the pin 146 of the watercraft 47 is retained in the hook 122 thus securing the watercraft 47 to the trailer, and the overcentering mechanism 124 is also in a locked position. When the overcentering mechanism 124 is in the locked position, the levers 128 and 130 are arranged such that they prevent the lever 118 and the hook 122 from pivoting in a CCW direction about the pivot axis 120 (i.e. towards the rear of the trailer, to the left of FIGS. 15 and 16) in response to a force applied directly to either one of the lever 118 and the hook 122 that would otherwise (i.e. except for the overcentering mechanism 124 being in the locked position) cause the lever 118 and the hook 122 to pivot in that direction. This means that once the releasable connector 152 (and therefore the overcentering mechanism 124) is in the locked position, even if the pin 146 applies a force to the hook 122 towards the rear of the trailer (because the watercraft 47 is being propelled backwards when the trailer is in the water, because the front of the trailer is raised, or because of the drag on the watercraft 47 when the trailer is being towed behind a vehicle), the hook 122 remains in the same position, retains the pin 146, and therefore maintains the watercraft 47 secured to the trailer. Since the releasable connector 52 secures the watercraft 47 in response to the hull 148 of the watercraft 47 pushing on the lever 118 as the watercraft 47 is being driven in the watercraft receiving portion of the trailer, there is no need for the driver of the watercraft 47 to get off the watercraft 47 to secure it to the trailer, and there is no need for another person to have to manually secure the watercraft 47 to the trailer, as was the case in the prior art.

It is contemplated that a visual indicator could be provided on, or associated with, the releasable connector 52 to indicate to the driver of the watercraft 47 that the releasable connector 52 is in the locked position. For example, when the releasable connector 52 is in the locked position, an arrow on the lever 118 or the hook 122 could be aligned with another arrow or a dot on one of the plates 112. If the two arrows (or the arrow and the dot) are out of alignment, then the driver knows that the releasable connector 52 is not in the locked position.

To release the watercraft 47 from the trailer, the cable 142 is pulled so as to rotate the lever 128 CCW (i.e. downwardly in FIG. 16) about the pivot axis 134, thus unlocking the overcentering mechanism 124. As a result, the levers 130 pivot CW and translate between the pivot axes 126 and 136, and the lever 118 and the hook 122 pivot CCW about the pivot axis 120 (i.e. towards a rear of the trailer) until the unlocked position of the releasable connector 52 shown in FIG. 15 is reached. Since the hook 122 in this position no longer retains the pin 146 of the watercraft 47, the watercraft is no longer secured to the trailer and can be driven (or pushed) out the watercraft receiving portion. Since the cable 142 is pulled using the actuator 56 provided to one side of the watercraft receiving portion rearwardly of the connector support, the driver of the watercraft 47 can release the watercraft 47 from the trailer while being seated on the watercraft 47.

Figure 17:
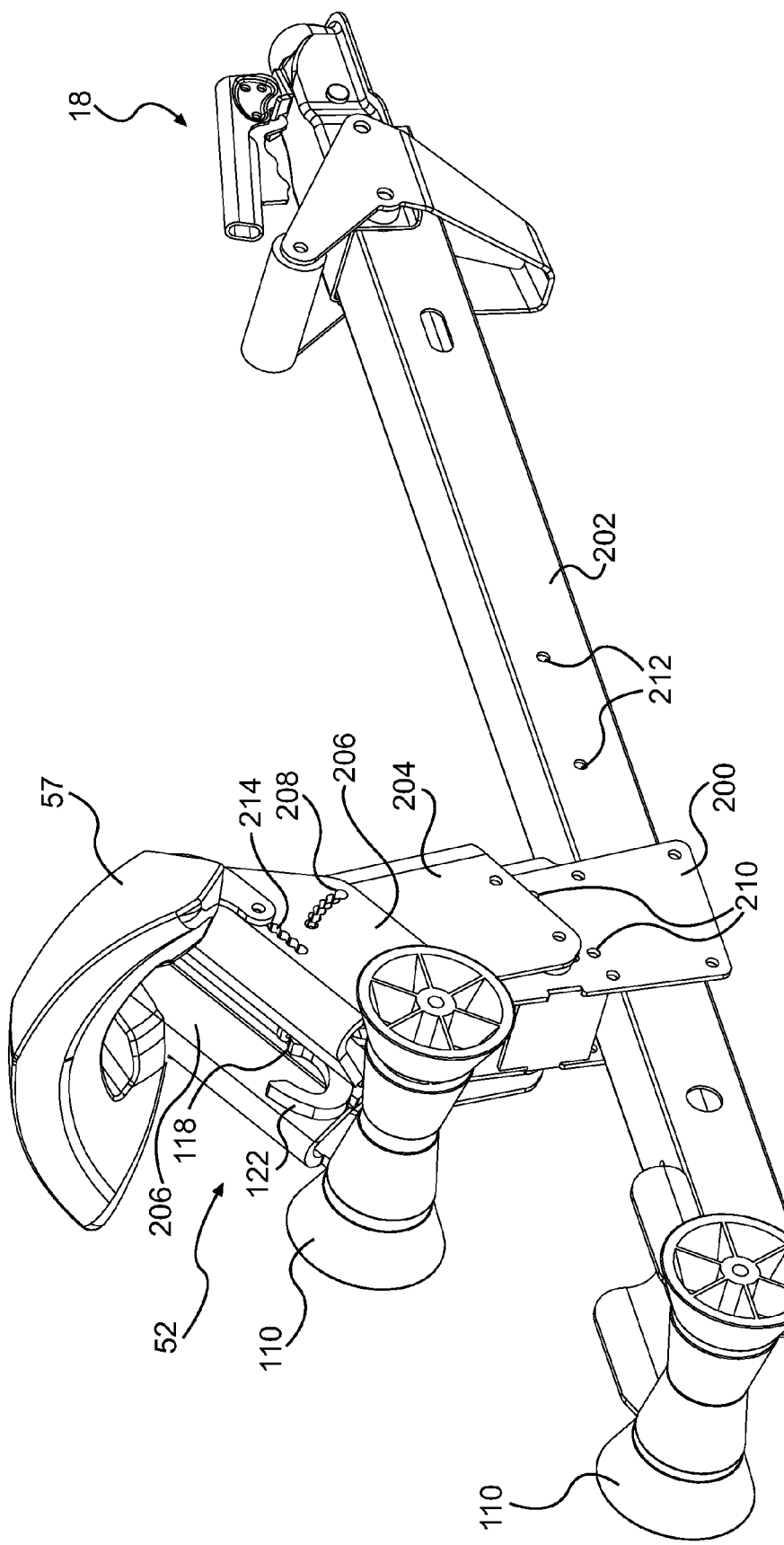
FIG. 17 is a perspective view, taken from a rear, right side, of another alternative embodiment of a connector assembly connected to the hitch coupler.

Turning now to FIG. 17, an alternative embodiment of a connector assembly will be described. As with the connector assembly shown in FIGS. 14 to 16, the connector assembly of FIG. 17 has a releasable connector 52, a bumper 57, and two rollers 110. However, the bow stop bar 54 has been replaced by a different connector support. The connector support of the connector assembly of FIG. 17 consists of a main bracket 200 mounted to a longitudinally extending frame member 202 of the trailer (in this case the member 202 to which the hitch coupler 18 is connected), a vertical adjustment bracket 204 connected to the main bracket 200, and angular adjustment brackets 206 connected to the vertical adjustment brackets 204. The releasable connector 52 is connected between the angular adjustment brackets 206. Apertures 208 in the angular adjustment brackets 206 used to connect the angular adjustment brackets 206 to the vertical adjustment bracket 204 allow the angular position of the releasable connector 52 to be adjusted to properly operate with the watercraft to be secured to the trailer. Apertures 210 in the main bracket 200 (some of which are hidden by the vertical adjustment bracket 204 in FIG. 17) used to connect the vertical adjustment brackets 204 to the main bracket 200 allow the vertical position of the releasable connector 52 to be adjusted to properly operate with the watercraft to be secured to the trailer. Apertures 212 in the frame member 202 (some of which are hidden by the main bracket 200 in FIG. 17) used to connect the main brackets 200 to the frame member 202 allow the longitudinal position of the releasable connector 52 to be adjusted to properly operate with the watercraft to be secured to the trailer. The bumper 57 is connected to the angular adjustment brackets 206. Apertures 214 in the angular adjustment brackets 206 allow the position of the bumper 57 to be adjusted to properly operate with the watercraft to be secured to the trailer. As would be understood, the connector assembly of FIG. 17 could be provided on the trailers 10 and 100.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method of securing a watercraft to a watercraft trailer, the method comprising:
    driving the watercraft in a watercraft receiving portion of the trailer;
    moving a retaining element, connected to a lever, forwardly from a first predetermined position to a second predetermined position located towards a front of the trailer in response to a hull of the watercraft coming into contact with the lever;
    retaining a pin, connected to the hull of the watercraft, with the retaining element in response to at least the retaining element moving forwardly towards the front of the trailer to the second predetermined position; and
    maintaining the retaining element in the second predetermined position to retain the pin.

2. The method of claim 1, wherein moving the retaining element forwardly towards the front of the trailer includes pivoting the retaining element, connected to the lever, forwardly from the first predetermined position to the second predetermined position located towards the front of the trailer in response to the hull of the watercraft coming into contact with the lever.

3. The method of claim 2, wherein the retaining element is a hook; and the method further comprises locking the hook into a locked position once the pin is retained.

4. A method of releasing a watercraft from a watercraft trailer, the trailer having a watercraft receiving portion, the watercraft being secured to the trailer by a releasable connector, the method comprising:
    actuating an actuator, the actuator disposed to one lateral side of the watercraft receiving portion and intermediate a front and a rear of the watercraft receiving portion;
    moving at least one portion of the releasable connector towards a rear of the trailer to an unlocked position in response to the actuation of the actuator, thus releasing a pin connected to a hull of the watercraft from the releasable connector; and
    maintaining the at least one portion of the releasable connector in the unlocked position following the actuation of the actuator.

5. The method of claim 4, wherein the actuator includes a cable connected to the releasable connector; and
    wherein actuating the actuator includes pulling on the cable.

6. The method of claim 4, wherein the releasable connector includes an overcentering mechanism.

7. The method of claim 6, wherein moving the least one portion of the releasable connector towards the rear of the trailer to the unlocked position includes moving the at least one portion of the releasable connector and the overcentering mechanism to the unlocked position in response to the actuation of the actuator.

* * * * *